United States Patent
Massarani (10) Patent No.: US 6,336,117 B1
(45) Date of Patent: Jan. 1, 2002

(54) CONTENT-INDEXING SEARCH SYSTEM AND METHOD PROVIDING SEARCH RESULTS CONSISTENT WITH CONTENT FILTERING AND BLOCKING POLICIES IMPLEMENTED IN A BLOCKING ENGINE

(75) Inventor: Leonardo C. Massarani, Westport, CT (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/302,851

(22) Filed: Apr. 30, 1999

(51) Int. Cl.[7] .............................................. G06F 17/00
(52) U.S. Cl. ...................................... 707/100; 707/104
(58) Field of Search ............................... 707/202, 1, 8, 707/10, 501, 513; 709/229, 239, 201, 217–219

(56) References Cited

U.S. PATENT DOCUMENTS

| | | | |
|---|---|---|---|
| 5,619,507 A | | 4/1997 | Tsuda |
| 5,619,648 A | | 4/1997 | Canale et al. |
| 5,625,815 A | * | 4/1997 | Maier et al. ................. 395/608 |
| 5,701,469 A | | 12/1997 | Brandli et al. |
| 5,706,507 A | * | 1/1998 | Schloss ....................... 395/615 |
| 5,778,361 A | | 7/1998 | Nanjo et al. |
| 5,781,906 A | | 7/1998 | Aggarwal et al. |
| 5,787,430 A | | 7/1998 | Doeringer et al. |
| 5,802,518 A | | 9/1998 | Karaev et al. |
| 5,802,524 A | | 9/1998 | Flowers et al. |
| 5,822,747 A | | 10/1998 | Graefe et al. |
| 5,832,500 A | | 11/1998 | Burrows |
| 5,835,722 A | | 11/1998 | Bradshaw et al. |
| 5,845,278 A | | 12/1998 | Kirsch et al. |
| 5,852,820 A | | 12/1998 | Burrows |
| 5,867,665 A | * | 2/1999 | Mutman et al. ........ 395/200.68 |
| 5,890,147 A | * | 3/1999 | Peltonen et al. ................ 707/1 |
| 6,065,055 A | * | 5/2000 | Hughes et al. .............. 709/229 |
| 6,128,627 A | * | 10/2000 | Mattis et al. ................ 707/202 |
| 6,178,419 B1 | * | 1/2001 | Legh-Smith et al. ........... 707/6 |

\* cited by examiner

Primary Examiner—Hosain T. Alam
Assistant Examiner—Tam V Nguyen
(74) Attorney, Agent, or Firm—Joseph C. Redmond, Jr.; Richard A. Tomlin, Esq.; Morgan & Finnegan, LLP (57) ABSTRACT

A content-indexing search system and method provides search results consistent with content filtering and blocking policies. The search system comprises a content-indexing search engine including a database coupled to an information network. A user provides search queries to the search engine through a gateway serving as a proxy server and cache and blocking engine. The blocking engine implements content filtering and blocking policies with respect to the search results. Alternative embodiments provide consistency between the results of the user content searches and the content filtering/blocking policies. One embodiment modifies the search engine to implement the same content blocking policy as the caching and filtering engine. Another embodiment modifies the search engine to build an indexing database by searching the caching and engine content. A third embodiment modifies the search engine to go through the cache and filter engine as the search engine builds its indexing database. A fourth embodiment modifies a search engine to go through a caching and filtering engine as it builds an indexing database.

15 Claims, 6 Drawing Sheets

FIG. 1

| User or Group ID 203 | Keywords to Block 205 | PICS Rules 207 | URL Black List 209 | URL White List 211 |
|---|---|---|---|---|
| ID | Sex Casino Drugs | Label Rule 1 Label Rule 2 Label Rule 1 | URL X URL Y URL Z | URL A URL B URL C |
| | | | | |
| | | | | |

CONTENT-INDEXING SEARCH SYSTEM AND METHOD PROVIDING SEARCH RESULTS CONSISTENT WITH CONTENT FILTERING AND BLOCKING POLICIES IMPLEMENTED IN A BLOCKING ENGINE

BACKGROUND OF THE INVENTION

1. Field of Invention

This invention relates to information retrieval systems. More particularly, the invention relates to a content-indexing search system and method providing search results consistent with content filtering and blocking policies implemented in a blocking engine.

2. Description of Prior Art

With the explosive growth of text and multimedia content that is available in the Internet and other data networks and systems, end users are increasingly relying on text and key word based search tools to locate information of potential interest. End users typically enter as input to a search tool or engine, key words describing the information and documents they are seeking. The search tool or engine will then search in an existing indexing database, and return a list of pointers to documents of potential interest, with document titles and often with a few descriptive lines of text extracted from the document body. End users will then proceed to navigate to some or all of the returned pointers to retrieve and view the actual document or online content. The search engine indexing database is typically built automatically or semi-automatically by launching an automaton program against a content source (such as Internet Web Sites), and having the automaton search the root content source as well as links to the content tree (often going to other sites), and indexing the information in the database for future searches. For large content sources, such as Web Sites on the Internet, automated searching and indexing is the only practical way to create an index search database.

With the increased diversity of information available on online systems and networks, corporations, individuals, groups, and Network Service Providers (NSPs) are increasingly implementing policies and controls to filter or otherwise limit the availability of content that is deemed inappropriate or undesirable for end users. Such content access control policies typically block undesirable content from reaching all or a subset of end users in a given online service and network. The blocking of content is typically performed in a content proxy gateway, data-network firewall, or other device inserted between the end user and the ultimate content source. Often the content filtering is implemented as part of a content caching engine, where only desirable content are kept in the cache for the user population, and undesirable content is prevented from being cached. All users can only access network content through the cache. Content is typically blocked for being offensive or inappropriate for a user group or business use or viewing at a particular time of day and other similar reasons. Often NSPs and corporations will rely on a rating system or service such as Platform For Internet Content Selection (PICS) to determine the suitability of a content site or document for a particular population. End users may also select their own self-imposed set of blocking policies in some systems.

A significant problem is presented to NSPs and data delivery providers between the need for automated search engines that automatically index vast amounts of content and the need for blocking engines to block some of the content to ultimately reach end users. Specifically, the problem is the lack of integration and coordination of the search engines with the filter and blocking policy engines. The lack of integration is caused by several reasons, including:

(a) Many organizations deploy and implement content filtering blocking policies on their sites or service which rely on search engines, such as those available on the Internet, over which they have no control.

(b) Search engines by design must find and index as much content as possible and are biased toward seeking all content aggressively. On the other hand, filtering and blocking engines by design attempt to be selective in the documents that are stored on caches and presented to end users.

The intrinsically different missions between search engines and blocking engines combined with the need for high performance and efficiency of implementation, impedes integration and coordination of these two information retrieval functions.

The problem is manifested in the fact that end users while utilizing the services of a search engine will be presented with search results containing content/document titles and descriptions to content documents that will be ultimately inaccessible based on the filtering/blocking policies. In addition to the end user inconvenience and frustration from the inconsistency, the titles and short description of the content/documents returned by the search engine may, in themselves, be highly offensive or otherwise undesirable.

Accordingly, the need exists in information retrieval systems to have search results conformed to and be consistent with blocking policies with as little protocol and performance impact as feasible.

Prior art related to content-indexing search and blocking systems includes the following:

U.S. Pat. No. 5,701,469 issued Dec. 23, 1997 (Brandli et al.) discloses a contact index search system which invokes search result correction routines to remove from the results stored search results incorrectly included and to add stored search results that were incorrectly excluded. In this manner, the search results generated in response to a user query is made accurate even though the content-index used to generate the initial search result was not up to date.

U.S. Pat. No. 5,835,722 issued Nov. 10, 1998, filed Jun. 27, 1996, (Bradshaw et al.) discloses a terminal for blocking the use and transmission of inappropriate material by comprehensively monitoring computer operations for creation or transmission of search inappropriate material, upon which the terminal is blocked and may only be unblocked by supervisory intervention.

U.S. Pat. No. 5,706,507 issued Jan. 6, 1998, filed Jul. 5, 1995, (Schloss) discloses an advisory server operated by a third party which rates the content of data downloaded from a content server to a client in order to block or sensor unwanted material.

U.S. Pat. No. 5,619,648 issued Apr. 8, 1997 (Canale et al.) discloses an e-mail filter which determines whether an e-mail message should be provided to a user in accordance with models of the users correspondence.

None of the prior art discloses a content-indexing search system which provides search results consistent with blocking policies implemented in a blocking engine whereby only content allowed by the blocking policies is returned to the end user as the result of the content search, making the search results consistent with the blocking policies.

SUMMARY OF THE INVENTION

An object of the invention is an improved information retrieval system and method of operation providing consistency between search engine results and content blocking policies.

Another object is an improved content-index search system and method of operation providing search results consistent with blocking policies.

Another object is an improved content indexing search system which implements blocking policies in a caching and filtering engine.

Another object is an improved content-indexing search system and method of operation implementing blocking policies during a content-indexing phase.

Another object is an improved content-indexing search system and method of operation implementing blocking policies during an end user's search result presentation phase.

Another object is an improved content-indexing search system and method of operation by searching a local repository of a caching and blocking engine in lieu of searching and indexing ultimate content site sources and content servers.

Another object is an improved content-indexing searching system and method of operation configured to go through a caching and filtering engine to reach a target content.

These and other objects, features and advantages are achieved in an information retrieval network including a content-indexing search engine having a database and a caching engine coupled between the search engine and the end user, for implementing control policies typically blocking undesirable content such that search results are consistent with an end users organization's filtering and blocking policies implemented in alternative embodiments.

In one embodiment, only content that is allowable by the blocking policy is added to the search engine indexing database. In a second embodiment, the search and presentation process of the search engine is modified to implement the blocking policies. In a third embodiment, the target of the search engine's scanning and indexing automaton process is modified to build an indexing database by searching the caching engine's content. In a fourth embodiment, the search engine's scanning and indexing automaton is configured in the same way as an end user browser, i.e., going through a caching and filtering engine to reach a target content.

DESCRIPTION OF DRAWING

The invention will be further understood from the following detailed description taken in conjunction with the appended drawing, in which.

DESCRIPTION PREFERRED EMBODIMENT

Figure 1:
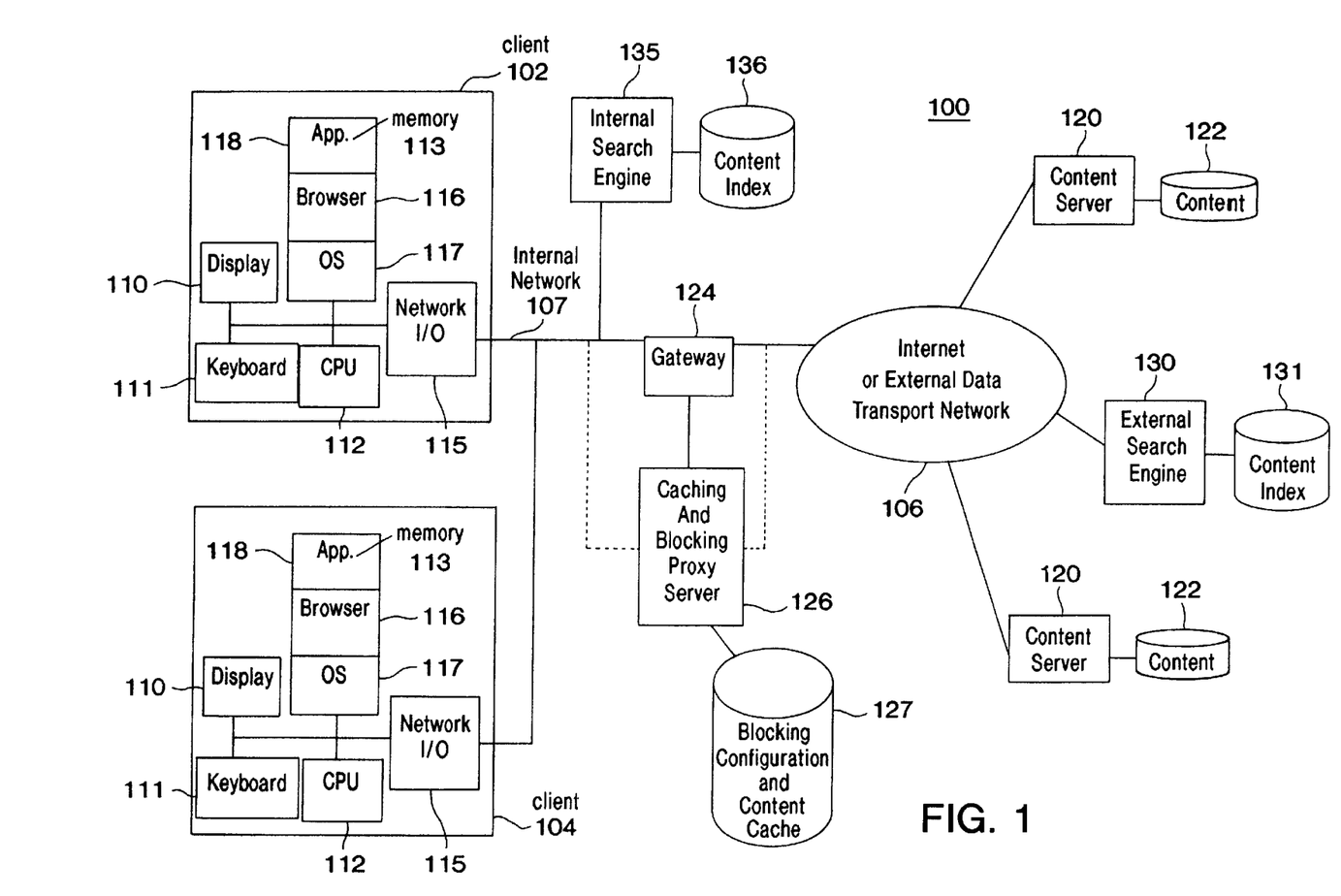
FIG. 1 is a block diagram of an information retrieval system including a content server having a database; a caching engine implementing blocking policies, an external search engine, the search engine coupled to an end user and the content server and incorporating the principles of the present invention.

In FIG. 1 an information retrieval system 100 includes a plurality of client devices 102, 104 connected through an internal or controlled network 107 to an external information system 106 such as the Internet or other distributed data network. A typical client is a PC having a display 110, a keyboard 111, a CPU 112, a memory 113 and a network connectivity I/O device 115. Examples of these clients and networks include business users of PCs connected to an internal company network and home users of PCs connected to a service provider network, both ultimately connected to the larger Internet. A browser 116, such as those sold under the trademark Netscape Communicator, IBM Web Explorer, and the like, is installed in the memory 113 along with a standard operating system 117 and application programs 118. The browser 116 runs or executes in the client device 102, 104 for loading or downloading content from a content server 120 coupled to the Internet 106. Each content server includes a database 122 for storing data responsive to content requests from the clients 102, 104, etc. In one form, data is stored as a collection of HTML documents containing text and other multi-media content.

A gateway 124 is usually used to interface more than one client or internal network segments 107 to the Internet 106 as shown. Typically a proxy server that includes a cache and content filtering engine 126 is inserted in the connection path from the internal network 107 to the Internet 106, to increase performance and control by implementing a content blocking policy. The caching and blocking proxy server can be connected to the gateway or have parallel direct connections to the internal 107 and external 106 networks.

A client system 102, 104 running the web browser 116 requests content from the content server 120 using a Hypertext Transfer Protocol (HTTP) request and receiving the content in a HTTP response. HTTP requests and responses occur over TCP/IP sockets that are communicated over the communication link between the client and the content server. A user may generate a content request by explicitly asking for content stored in the content server or by taking on a hyperlink anchor which points to contents stored on content servers. Upon receipt, the browser loads that content using an HTTP session. A more detailed description of HTTP may be found in Berners-Lee et al., "Hypertext Transfer Protocol—HTTP/1.0" Draft IEFT-HTTP-V10-Spec-0.0 Text." 1995 (March 8) Internet Draft, herein incorporated by reference in its entirety. A more detailed description of HTML may be found in Berners-Lee "Hypertext Markup Language (HTML)" Draft IEFT.IIIR-HTML-01, June 1993 (expired working draft), herein incorporated by reference in its entirety. A detailed description of TCP/IP Sockets and Communication on the Internet may be found in W. Richard Stevens, "TCP/IP Illustrated, Vol. 1—The Protocols", Addison-Westlake, 1994, pages 1–20, 229–262, herein incorporated by reference in its entirety.

A user of a client system utilizing the web browser 116 will often access a conventional search engine server 130, 135 and databases 131, 136, respectively, specialize to locate Internet content by means of keyword searches. These secured search engine servers can be external 130, or internal 135 to the controlled network 107. While they perform the same basic function, internally attached search engine servers 135 can be independently controlled by the internal network operator and are preferred. The methods of this invention, would typically be implemented by internally attached and controlled search engines 135, or by external search engines 130 that provide, as a service to an organization, consistency with the organizations content blocking policy. As a result of a keyword search directed at a search engine server 130 or 135, end users will see displayed in the web browser 116 a list of matching URLs and text excerpts displayed as hyperlink anchors to the ultimate content. The user can then select and follow the link to one or more content matches using the web browser 116.

Figure 2:
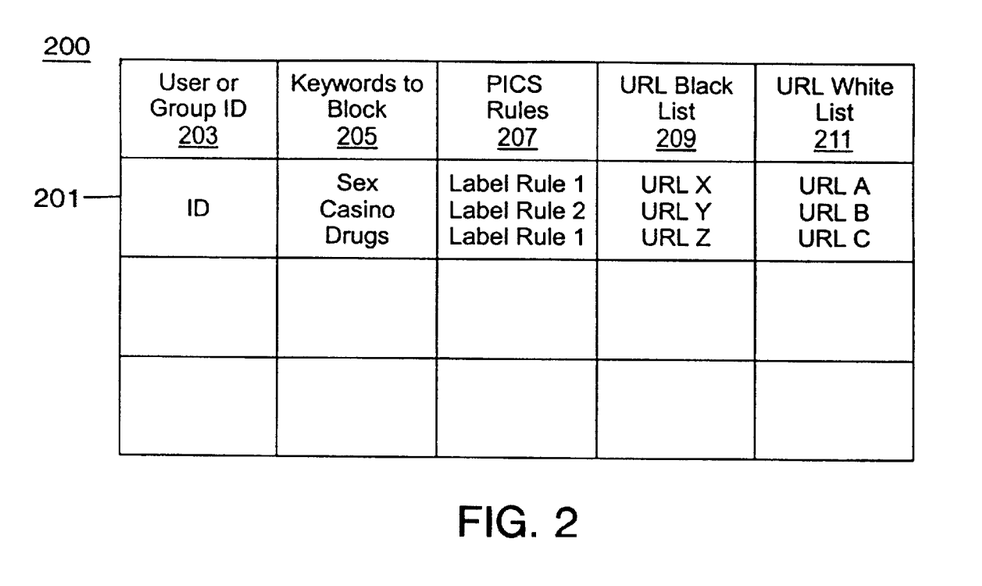
FIG. 2 is a representative content blocking rules table implemented in FIG. 1.

In FIG. 2, a content sample filtering/blocking configuration table 200 is generated by the client or by a network/service administrator and installed at the proxy server 126 to filter or otherwise limit the availability of content that is deemed inappropriate or undesirable. These content access control policies typically block undesirable content from reaching all or a subset of end users in a given online service or network. The table is installed in the cache and filtering engine 126, and is typically stored in a database 127. In one form, the table comprises a row 201 including for each user or group of users one or more of the following: an Id 203; a list of keywords to block 205; Platform For Interconnect content Selection (PICS) rules 207, a black list of URLs not to be contacted 209, a white list of the only URLs that can be contacted 211. A description of URLs may be found in Berners-Lee et al. "Uniform Resource Locators (URL)", RFC 1738, December 1994, herein incorporated by reference in its entirety. PICs ratings are obtained from PICs Rules that allow or block access to URLs based on PICs labels incorporated into documents which describe the URLs. PICS rules are described in the Internet at http://www.w3.org/TR/REC-PICSRules-971229, published by W3C, MIT, 77 Massachusetts Avenue, Cambridge, Mass. 02139, dated Dec. 29, 1997. More specifically, PICS Rules is a language for expressing filtering rules (profiles) that allow or block access to URLs based on PICS labels that describe those URLs. The labels are created using a software tool in accordance with a PICS Technical specification-1.1 available in the Internet at http://www.w#.org/PICS/. The software tool is used to create labels in a document that describe particular URLs. Alternatively, in lieu of pasting the labels into documents, an independent reader distributes the labels through a separate server called a Label Bureau. Filtering software will know to check at that Label Bureau to find the labels much as a consumer knows to read particular magazines for review of appliances or automobiles. Once the label has been created, the label is inserted as an extra header in the HTTP header stream that precedes the content of the documents that are sent to the web browser. Alternatively, the labels can be imbedded in HTML documents using a META tag. With this method, labels are sent only with HTML documents, not with images, video or anything else. A PICS-complaint content server is available from International Business Machines Corporation, Armonk, N.Y.

With the blocking table installed in the cache and blocking engine 122, several process alternatives are available to couple content search and content blocking engine, such that only content ultimately allowed by the blocking policy is returned to the client as the result of the content search. While it is possible to have different rules for each individual user, it is more manageable to have a single set of rules that apply to all users, or to divide users into a small number of user groups, each with its own rule. Individual users or groups, if defined, can be identified by using several means, including: client system IP address to user/group ID mappings, use of HTTP basic authentication at the start of a browsing session, us of HTTP web "cookies" to track user identity.

Figure 3:
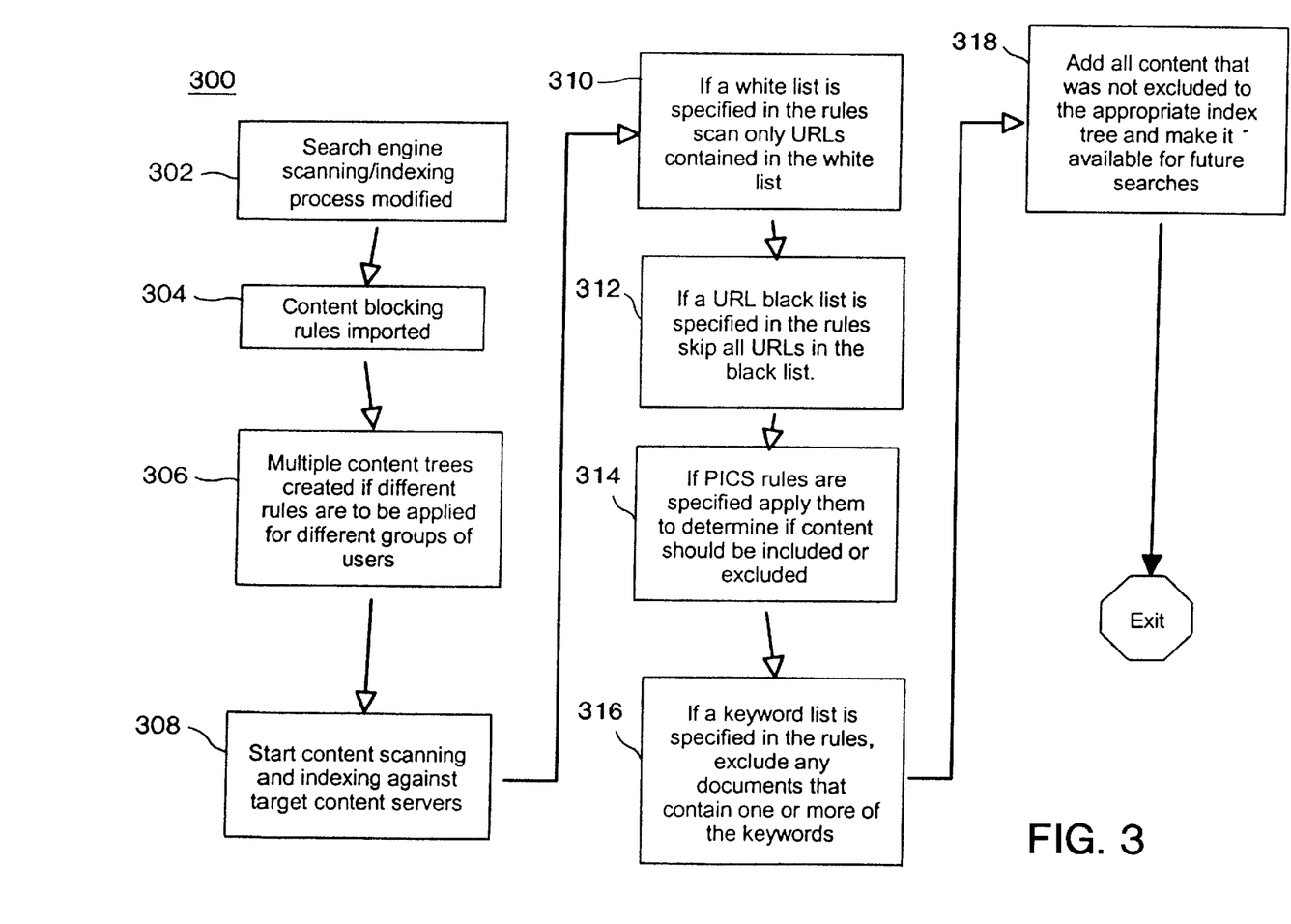
FIG. 3 is a flow diagram illustrating the operation in a first embodiment implementing a blocking policy during a content search and indexing phase.

Turning to FIG. 3, a process 300 implements the blocking policy during the content indexing phase. In step 302 the search engine's 135 content scanning and indexing automaton process is modified. In step 304, the content filtering rules from the content and filtering engine 126 are imported into the search engine server 135 via Application Program Interfaces (APIs) or transfer of rule definition files, at regular intervals, or whenever a change is detected. In step 306, multiple indexing database trees are created as needed and each tree is associated with a user group as defined in the content filtering rules. For example, one indexing database tree for children with a strict PICs filtering rule; one tree for adults with more liberal filtering rules.

In step 308 the search engine's automaton process starts scanning and indexing content from the list of target servers while the content blocking rules are consulted.

In step 310, if a white list is present, the search engine searches only web sites or root content sources that match the explicit allowable site/URL list or white list.

In step 312, if a black list of URLs to exclude is configured in the rules, any web site URL that matches a the black list pattern is exclude.

In step 314, the PICS rules that apply to the user set being serviced by the indexing database tree is applied to the site/content/document being processed, resulting in the document being excluded or included.

In step 316, if an exclusionary keyword list is specified, the document text is scanned and the document is excluded if it contains one or more keywords in the list.

In step 318, a document is added to the appropriate indexing database tree only if it is allowed by the filtering rules for that group.

The advantage of the process of FIG. 3 is that all additional (exclusion) processing is performed in the database indexing phase. There is little additional processing needed on the users search processing and presentation phases. Presumably, search operations are much more frequent than indexing operations in the life cycle of a search engine, even with re-scanning of content for possible changes.

Figure 4:
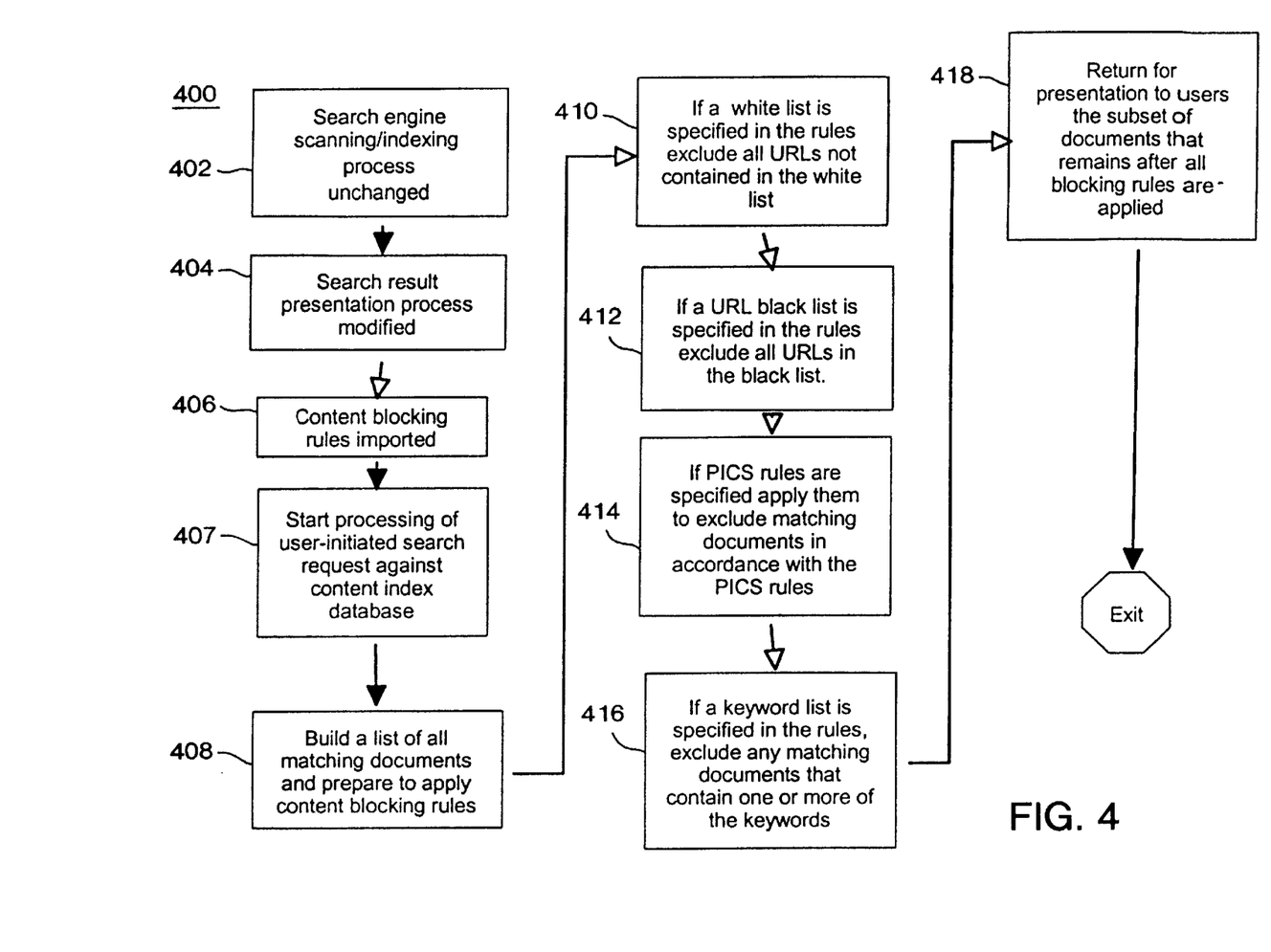
FIG. 4 is a flow diagram of FIG. 1 in a second embodiment implementing a blocking policy during an end user's search result presentation phase.

In FIG. 4, another process 400 implements a blocking policy during the end users search result presentation phase. In step 402, the scanning and indexing automaton process of the search engine is unchanged and a single indexing database tree is preserved. In step 404, the search and presentation process of the search engine is modified to apply blocking policies.

In step 406, the content filtering rules from the caching engines (via APIs or transfers of rule definitions are imported into the search engine at regular intervals or whenever a change is detected.

In step 407, processing of a user-initiated search request is started against the index database.

In step 408 a list of all matching documents satisfying the user's request is built and prepared for application of the blocking rules.

In step 410, if a while list of explicitly allowable URLs is specified in the rules, all matching documents not contained in the white list are excluded.

In step 412, any web site, URL or document that matches an exclusion pattern list (blacklist) is excluded.

In step 414, if PICS rules are specified, any URL that fails to conform with the PICS rules is excluded.

In step 416, if an keyword list is specified in the rules, any URL that contains in its text one or more words in the list is excluded.

In step 418, the remaining subset of URL pointers that match the users request and satisfy the blocking rules is returned for presentation to the client.

The primary advantage of the process of FIG. 4 is that the latest policy can be applied to each search without impact of rebuilding the indexing databases. A single indexing database can be used for all users. The process allows the definition of altering filtering groups down to individual controls with little impact.

Figure 5:
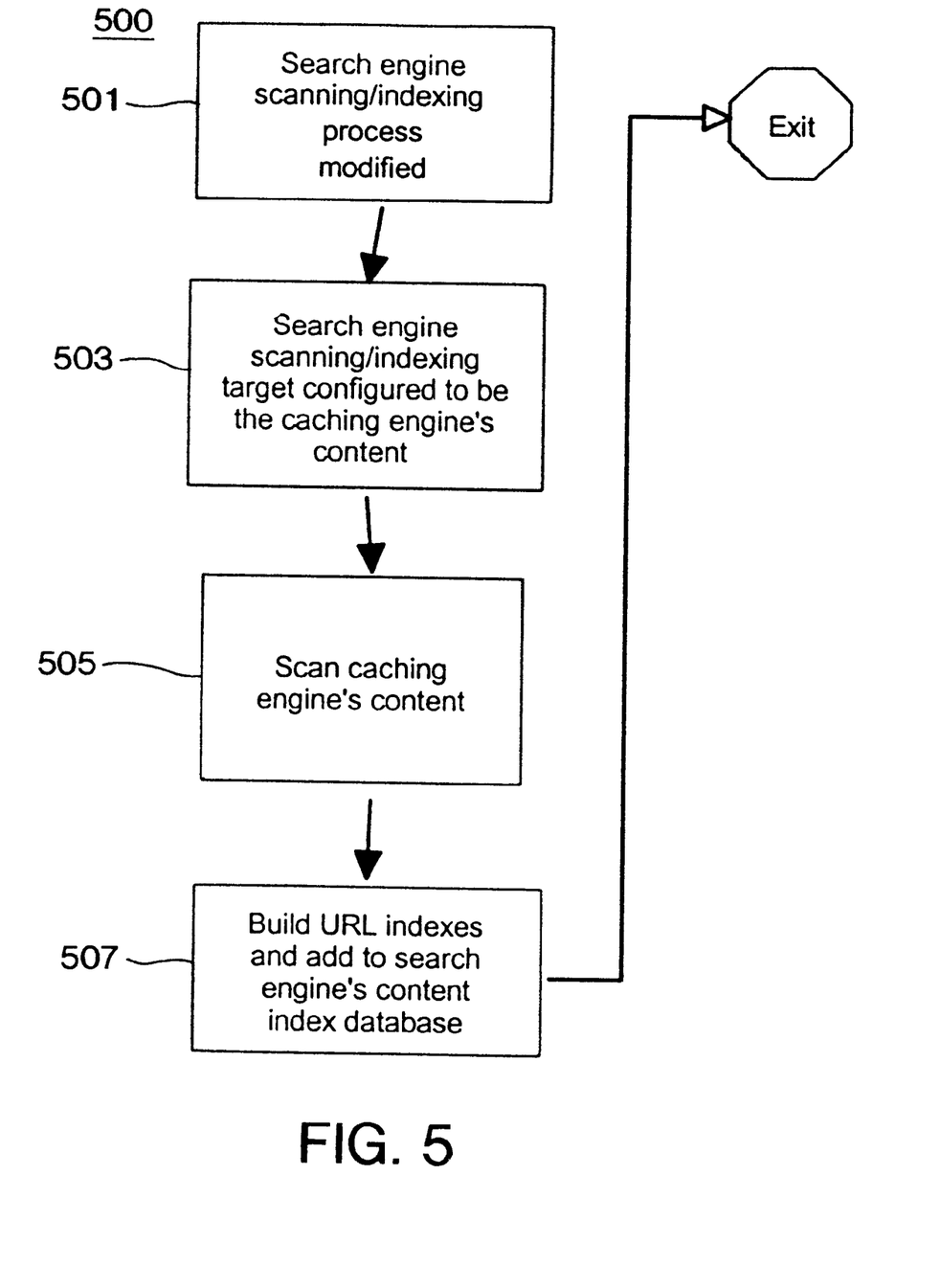
FIG. 5 is a flow diagram of the search engine of FIG. 1 in a third embodiment in which the search engine is modified to building an indexing database by searching the caching engine content.

In FIG. 5 a process 500 modifies the search engine to build its indexing database by searching the content caching engine's content. In step 501 the search engine scanning and indexing automaton process is modified. Instead of searching and indexing the ultimate content source sites and content servers, the process is configured to search the local repository of the content of the caching and blocking engine. In step 503, the search engine's scanning target is modified to be an appropriate content caching storage rather than a site/URL list. In step 505, the URL/content/document tree in the caching and blocking engine is traversed via APIs, database operations or shared filed system operations. In step 507, any document found in the cache is added to the indexing database as complying with the blocking filtering policy to one or more user groups in local installation.

The primary advantage of the process of FIG. 5 is the application of the filtering and blocking rules is done only once by the engine designed to do so, i.e., the caching and blocking engine. The scanning and indexing operation is performed on a local (high performance) copy of the target content, rather than the more variable Internet content sites.

Figure 6:
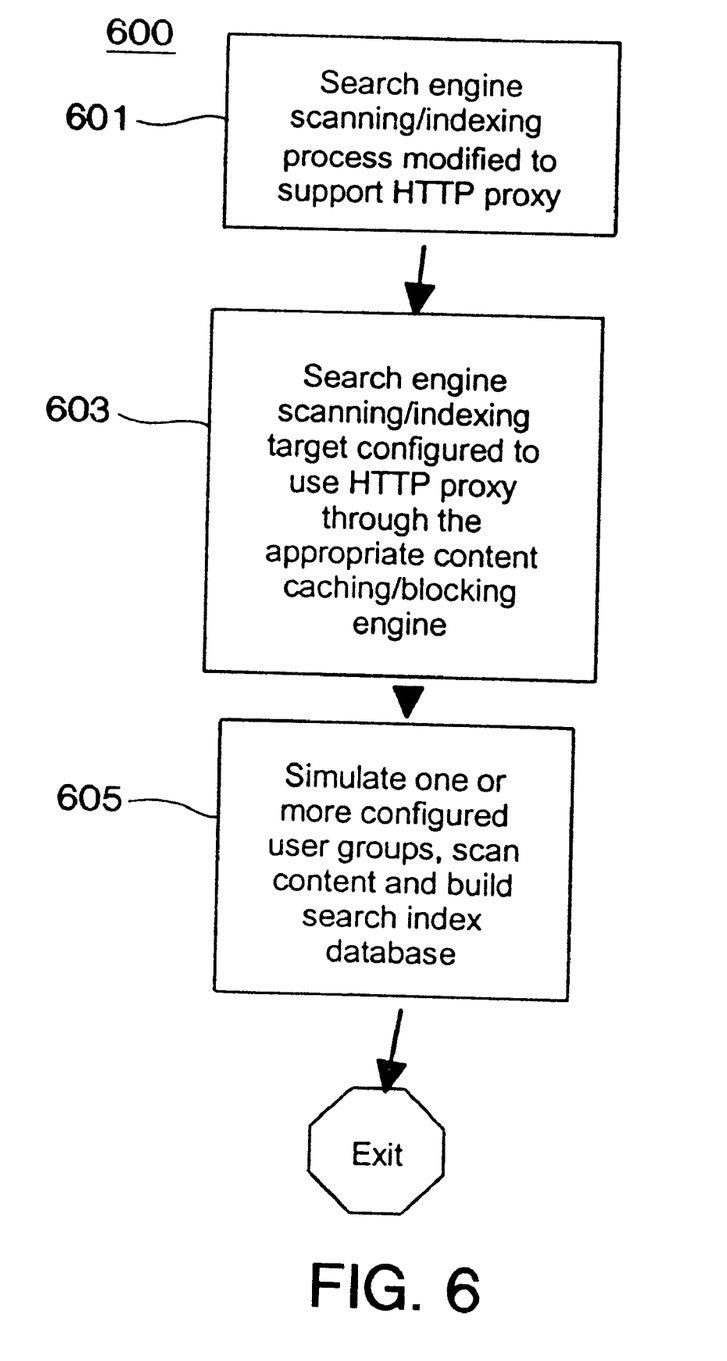
FIG. 6 is a flow diagram of the search engine of FIG. 1 in a fourth embodiment modifying a search engine to go through a caching and filtering engine as it builds an indexing database.

In FIG. 6, a process 600 modifies the search engine to go through the caching and filtering engine as the search engine builds its indexing database. In step 601, the search engine scanning and indexing automaton is modified to be configured in the same way as an end user browser, i.e., use HTTP proxy to go thorough the caching and filtering engine to reach the target content. In step 603 the search engine automaton is configured to use HTTP proxy configured to the appropriate caching and filtering engine. In step 605, while scanning and indexing content, the search engine automaton is configured to simulate an end user belonging to one of the user groups such that the user will receive only a subset of site/contents/documents that are allowed by the policy for that user group.

The primary advantage of the process of FIG. 6 is that there is virtually no modification of the search engine. The content blocking and filtering is performed by the caching and blocking engine which was designed and optimized to do so. Only content allowed by the blocking policy will reach the search engine for indexing. The efficiency and performance of the search engine is increased since some of the site/contents to be scanned and indexed will be found in a local cache store.

Summarizing, content searching and content blocking engines are coupled such that only pointers to content ultimately allowed by a blocking policy is returned to the end user as the result of a content search. Multiple processes are described for coupling the content search and content blocking engines. As such, the invention provides consistency between the results of an end user contents search and an individual organization's content filtering and blocking policy. The invention is immediately available to existing Internet and other networks; data protocols and standards without the need for modification.

While the invention has been described in the Internet (HTTP/web) environment, the same concepts apply to most data and network environments where data is searched; a list of possible matches is presented to end users who in turn consume/view that data if allowed by access or content control policy. Various changes can be made therein without departing from the spirit and scope of the invention as defined in the appended claims, in which:

I claim:

1. A content-indexing search system providing search results consistent with content-filtering and blocking restrictions, comprising:
   a content-indexing search engine including a database;
   a content caching and blocking proxy server including a cache;
   an information network coupled to the content-indexing search engine;
   means for providing search queries to the content-indexing search engine and receiving search results from the cache;
   a blocking engine coupled to the content-indexing search engine including a blocking rules table comprising at least one of the following: a URL White List; a URL Black List;
   implementing content-filtering and blocking policies; and
   means for modifying the content engine search engine to implement the same content-blocking policies as the blocking engine.

2. The system of claim 1 further comprising means for implementing the blocking policies in the search content-indexing search engine during the content-indexing phase.

3. The system of claim 1 further comprising means for implementing the blocking policy during an end user search results presentation phase.

4. The system of claim 1 further comprising modifying the content engine search engine to build an indexing database by searching the cache content.

5. The system of claim 1 further comprising means for modifying the content-indexing search engine to incorporate the cache and blocking engine results as the content-indexing search engine builds an indexing database.

6. In a content-indexing search system including a content-indexing search engine coupled to a database and a cache; an information network coupled to the contact-indexing search engine; and a blocking engine including a blocking rules table comprising at least one of the following: at URL white list, a URL black list and implementing content-filtering and blocking restrictions on search results provided to an end user through the cache, a method of providing the search results which are consistent with the content-filtering and blocking practices, comprising the steps of:
   (a) altering the content-indexing search engine process to skip any information site URL that matches an exclusion pattern;
   (b) altering the search content-indexing search engine process to search only sites or route content sources that match an explicit allowable information site URL list;
   (c) implementing filtering policies in the content-indexing search engine are defined in the cache and the blocking engine by:
      (i) importing the content-filtering rules from the caching and filtering engine at regular intervals or whenever a change is detected;
      (ii) creating multiple indexing database trees and associating each tree with a user group as defined in the content filtering rules;

(iii) avoiding presentation to a user of any information site, URL or document that matches an exclusion pattern;

(iv) presenting only document/content pointers from sources that match an expressed allowable information site URL list; and (v) presenting to the user only information network/content/documents that comply with filtering processes defined in the cache and the blocking engine by;

(aa) importing the content filtering roles from the caching and filtering engine at regular intervals or whenever a change is detected; and (bb) presenting to the user only search results that are allowed by the filtering rules for that individual or group.

7. The method of claim 6 further comprising the steps of:

(d) modifying the content engine scanning target to be a content caching storage rather than an information site/URL list; and (e) traversing by APIs, database operations, and shared file operations a URL/content/document tree in the caching and blocking engine.

8. The method of claim 6 further comprising the step of:

(f) modifying the search engine content scanning and indexing process to be configured the same way as an end user browser.

9. The method of claim 6 further comprising the step of:

(g) modifying the content-indexing search engine to go through the cache as it builds an indexing database.

10. The method of claim 6 further comprising the step of:

(h) modifying the content search engine to build an indexing database by searching the cache.

11. The method of claim 6 further comprising the steps of:

(i) connecting the content-indexing search engine to an internal network; and (j) connecting the content-indexing search engine by an internal network operation.

12. The method of claim 6 further comprising the step of connecting content-indexing search engine to an external network for providing consistency to an organizations content blocking policy.

13. The content-indexing search system of clam 1 further comprising:

blocking keywords in the blocking table.

14. The content-indexing search system of claim 1 further comprising:

PICs rules in the blocking table.

15. A program medium, executable on a computer system, for blocking undesirable content received from a content-indexing search system comprising:

(a) program instruction altering the content-indexing search engine process to skip any information site URL that matches an exclusion pattern;

(b) program instructions altering the search content-indexing search engine process to search only sites or route content sources that match an explicit allowable information site URL list;

(c) program instructions presenting to a user only information network/content/documents that comply with filtering processes defined in the cache and the blocking engine by:

(d) program instructions importing the content filtering rules from the caching and filtering engine at regular intervals or whenever a change is detected; and (e) program instructions presenting to the user only search results that are allowed by the filtering rules for that individual or group.

* * * * *